United States Patent [19]

Meyer et al.

[11] 3,832,400

[45] Aug. 27, 1974

[54] CARBAMOYL OXIMES

[75] Inventors: Willy Meyer, Basel; Beat Boehner, Binningen, both of Switzerland

[73] Assignee: Ciba-Geigy Corporation, Ardsley, N.Y.

[22] Filed: Aug. 9, 1972

[21] Appl. No.: 279,139

[52] U.S. Cl... 260/566 AC, 260/327 M, 260/566 A, 424/277, 424/327
[51] Int. Cl. .......................................... C07c 119/00
[58] Field of Search .............................. 260/566 AC

[56] References Cited
UNITED STATES PATENTS

| | | | |
|---|---|---|---|
| 3,506,698 | 4/1970 | Jelinek ......................... | 260/566 AC |
| 3,681,386 | 8/1972 | Fridinger et al.............. | 260/566 AC |
| 3,721,711 | 3/1973 | Maravetz...................... | 260/566 AC |

*Primary Examiner*—Bernard Helfin
*Assistant Examiner*—Gerald A. Schwartz
*Attorney, Agent, or Firm*—Harry Falber; Frederick H. Rabin

[57] ABSTRACT

New carbamoyl oximes, their manufacture and their pesticidal activity especially against insects and representatives of the order acarina are disclosed. The compounds correspond to the formula

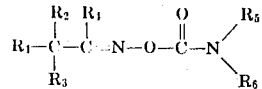

wherein $R_1$ represents alkylthio,

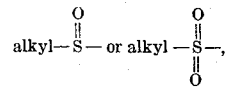

$R_2$, $R_4$ and $R_5$ each represents hydrogen or alkyl, $R_3$ represents —$CH_2$-alkoxy, —$CH_2$-alkylthio, —CH(alkylthio)$_2$, —CH(alkoxy)$_2$,

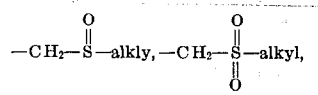

—$CH_2$-alkenyloxy, —$CH_2Cl$, —CHO or

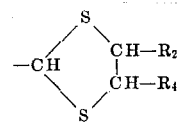

and $R_6$ represents hydrogen, alkyl, alkenyl or acetyl.

10 Claims, No Drawings

CARBAMOYL OXIMES

The present invention relates to new carbamoyl oximes, their manufacture and their use in pest control. The carbamoyl oximes have the formula

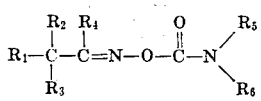

wherein $R_1$ represents alkylthio,

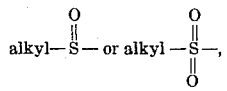

$R_2$, $R_4$ and $R_5$ each represents hydrogen or alkyl, $R_3$ represents —$CH_2$-alkoxy, —$CH_2$-alkylthio, —CH(alkylthio)$_2$, —CH(alkoxy)$_2$,

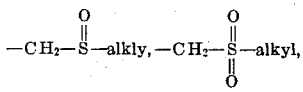

—$CH_2$-alkenyloxy, —$CH_2Cl$, —CHO or

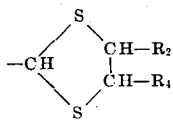

and $R_6$ represents hydrogen, alkyl, alkenyl or acetyl.

The alkyl and alkenyl groups which are possible for $R_1$ to $R_6$ contain from 1 to 4 or 2 to 4, preferably 1 to 2 or 2 to 3, carbon atoms and may be branched or straight chain.

Examples of such alkyl or alkenyl groups include: methyl, ethyl, propyl, isopropyl, n-, i-, sec. and tert.butyl, 1-allyl and 2-allyl.

Compounds of the formula I are preferred, wherein $R_1$ represents $C_1$–$C_4$ alkylthio, $C_1$–$C_4$ alkylsulphenyl or $C_1$–$C_4$ alkylsulphonyl, $R_2$, $R_4$ and $R_5$ each represents hydrogen or $C_1$–$C_4$ alkyl, $R_3$ represents —$CH_2O$—$C_1$–$C_4$ alkyl, —$CH_2$—O—$C_3$–$C_5$ alkenyl, —$CH_2S$—$C_1$–$C_4$ alkyl, —$CH_2SO$—$C_1$–$C_4$ alkyl, —$CH_2$—$SO_2$—$C_1$–$C_4$ alkyl, —CHO or —$CH_2Cl$ and $R_6$ represents hydrogen, $C_1$–$C_4$ alkyl, $C_3$–$C_5$ alkenyl or acetyl.

Particularly preferred, however, are compounds of the formula I, wherein $R_1$ represents $C_1$–$C_4$ alkylthio, $C_1$–$C_4$ alkylsulphenyl or $C_1$–$C_4$ alkylsulphonyl, $R_2$, $R_4$ and $R_5$ each represents hydrogen or methyl, $R_3$ represents —$CH_2O$—$C_1$–$C_4$ alkyl; —$CH_2O$—$C_3$–$C_5$ alkenyl, —$CH_2$—S—$C_1$–$C_4$ alkyl, —$CH_2SO_2$—$C_1$–$C_4$ alkyl or —$CH_2Cl$ and $R_6$ represents hydrogen, $C_1$–$C_4$ alkyl or $C_3$–$C_5$ alkenyl.

On account of their action, compounds of the formula I are particularly preferred, wherein $R_1$ represents methylthio, methylsulphenyl or methylsulphonyl, $R_2$, $R_4$ and $R_5$ each represents hydrogen or methyl, $R_3$ represents —$CH_2O$—$C_1$–$C_3$ alkyl, —$CH_2S$—$C_1$–$C_3$ alkyl, —$CH_2$—$SO_2$—$C_1$–$C_3$ alkyl, —$CH_2$—O—$C_3$–$C_4$ alkenyl or —$CH_2Cl$, and $R_6$ represents methyl, ethyl or allyl, or, in particular, compounds of the formula I, wherein $R_1$ represents methylthio, methylsulphonyl, $R_2$ represents methyl, $R_3$—$CH_2$—S—$C_1$–$C_2$ alkyl, —$CH_2O$—$C_1$–$C_2$ alkyl or —$CH_2$—O—$CH=CH_2$, $R_4$ represents hydrogen, $R_5$ represents hydrogen or methyl and $R_6$ represents methyl or allyl.

Examples of such compounds include:
3-methoxy-2-methylsulphinyl-2-methyl-N-methylcarbamoyl-propaldoxime,
3-methoxy-2-methylthio-2-methyl-N-ethylcarbamoyl-propaldoxime,
3-methoxy-2-methylthio-2-methyl-N-acetylmethylcarbamoyl-proparldoxime,
3-methoxy-2-methylthio-2-methyl-N-allylcarbamoyl-propaldoxime,
3-methoxy-2-methylsulphinyl-2-methyl-N-acetyl-N-methylcarbamoyl-propaldoxime,
3-methoxy-2-methylsulphonyl-2-methyl-N-acetyl-N-methylcarbamoyl-propaldoxime,
3-ethoxy-2-methylthio-2-methyl-N-methylcarbamoyl-propaldoxime,
3-ethoxy-2-methylsulphinyl-2-methyl-N-methylcarbamoyl-propaldoxime,
3-ethoxy-2-methylsulphonyl-2-methyl-N-methylcarbamoyl-propaldoxime,
3-allyloxy-2-methylthio-2-methyl-N-methylcarbamoyl-propaldoxime,
3-allyloxy-2-methylthio-2-methyl-N-acetyl-N-methylcarbamoyl-propaldoxime,
2,3-di-methylthio-2-methyl-N-methylcarbamoyl-propaldoxime,
2,3-di-methylsulphonyl-2-methyl-N-methylcarbamoyl-propaldoxime,
2-ethylthio-3-methylthio-2-methyl-N-methylcarbamoyl-propaldoxime,
3-methylsulphonyl-2-ethylsulphonyl-2-methyl-N-methylcarbamoyl-propaldoxime,
3-methoxy-2-ethylthio-2-methyl-N-methylcarbamoyl-propaldoxime,
3-methoxy-2-ethylsulphinyl-2-methyl-N-methylcarbamoyl-propaldoxime,
3-methoxy-2-ethylsulphonyl-2-methyl-N-methylcarbamoyl-propaldoxime,
3-methylsulphonyl-2-ethylsulphonyl-2-methyl-N-methylcarbamoyl-propaldoxime,
3-methoxy-2-methylthio-1,2-dimethyl-N-methylcarbamoyl-propaldoxime,
3-methoxy-2-methylsulphinyl-1,2-dimethyl-N-methylcarbamoyl-propaldoxime,
3-methoxy-2-methylsulphonyl-1,2-dimethyl-N-methylcarbamoyl-propaldoxime,
3-chloro-2-methylsulphinyl-1,2-dimethyl-N-methylcarbamoyl-propaldoxime,
3-chloro-2-methylsulphonyl-1,2-dimethyl-N-methylcarbamoyl-propaldoxime,
2,3-dimethylthio-1,2-dimethyl-N-methylcarbamoyl-propaldoxime,
3-ethylthio-2-methylthio-1,2-dimethyl-N-methylcarbamoyl-propaldoxime,
3-allyloxy-2-methylthio-1,2-dimethyl-N-methylcarbamoyl-propaldoxime,
3-methoxy-2-methylthio-1-methyl-N-methylcarbamoyl-propaldoxime,
3-methoxy-2-methylsulphinyl-1-methyl-N-methylcarbamoyl-propaldoxime,
2,3-dimethylthio-1-methyl-N-methylcarbamoyl-propaldoxime, 3-methoxy-3-methylthio-N-methylcarbamoyl-propaldoxime,
3-methoxy-2-methylsulphinyl-N-methylcarbamoyl-propaldoxime,
3-methoxy-2-methylsulphonyl-N-methylcarbamoyl-propaldoxime,
2,3-dimethylthio-N-methylcarbamoyl-propaldoxime, 3-methoxy-2-methylthio-2-methyl-N,N-dimethylcarbamoyl-propaldoxime,
2-(1,3-dithiolan-2-yl)-1-methylthio-1-methyl-N-methylcarbamoyl-ethanaldoxime,
3-methoxy-2-methylthio-2-methyl-N-methylcarbamoyl-propaldoxime,
3-methoxy-2-methylsulfonyl-2-methyl-N-methylcarbamoyl-propaldoxime,
3,3-diethoxy-2-methylthio-2-methyl-N-methylcarbamoyl-propaldoxime,
2-methylthio-2-formyl-N-methylcarbamoyl-propaldoxime,
3-methoxy-2-methylthio-2-methyl-N-ethylcarbamoyl-propaldoxime,
3-methoxy-2-methylthio-2-methyl-N-allylcarbamoyl-propaldoxime, The carbamoyl oximes of the formula I are manufactured by methods which are known to the art by reacting an oxime of the formula

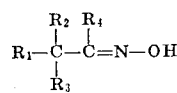

(II)

either
 a. with an isocyanate of the formula $$R_6N=C=O$$

(III)

or
 b. with a carbamic halide of the formula

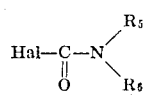

(IV)

in which Hal represents chloride or bromine, or
 c. with the components of which the carbamic halide of the formuls IV is formed, namely phosgene and an amine of the formula

(V)

optionally in the presence of an acid binding agent and a solvent or diluent which is inert towards the reactants. In the formula II to V, the symbols $R_1$ to $R_6$ have the meanings given for the formula I.

Suitable acid binding agents are: tertiary amines, e.g. trialkylamines, pyridine, pyridine bases, dialkyl anilines; inorganic bases, such as hydrides, hydroxides; carbonates and bicarbonates of alkali and alkali earth metals.

In the reaction with an isocyanate of the formula III it is necessary in many cases to use catalysts, e.g. tertiary amines or organo-tin compounds.

Examples of suitable inert solvents or diluents are: ethers and ethereal compounds, such as diethyl ether, dipropyl ether, dioxan, tetrahydrofuran; amides, such as N,N-dialkylated carboxylic amides; aliphatic, aromatic and halogenated hydrocarbons, in particular benzene, toluene, xylenes, chloroform, chlorobenzene; nitriles, such as acetonitrile, dimethyl sulphoxide.

The processes a) to c) are carried out at a reaction temperature between 0°C–100°C.

It is known that oximes may be in the stereoisomeric form: the syn-form and anti-form. The carbamoyl oximes of the formula I are also present in these two forms. Within the scope of the present invention, the term "carbamoyl oximes of the formula I" is accordingly to the understood as referring to both stereoisomeric forms.

The starting materials of the formula II have not so far been described in the literature. They may be manufactured according to the following scheme:

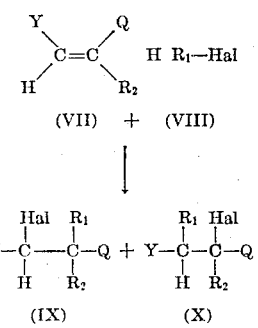

Pure compounds of the formula IX or mixtures of the formulae IX and X are formed in the above reaction, depending on the reaction conditions.

The intermediate products of the formula IX can be converted with alcohols or mercaptans or their alkali salts into compounds of the formulae IXa or IXb

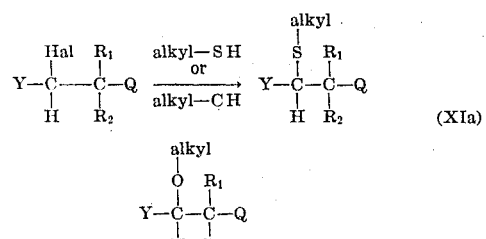

In the formulae VII to XIb, Hal represents chlorine or bromine, Q represents an aldehyde-(

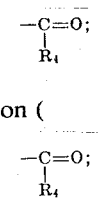

$R_4$ = H) or keto function (

$R_4$ = alkyl) and derivatives thereof, e.g. acetals, ketals, oximes, acrylals, carbamoyl oximes etc. and Y represents hydrogen, alkoxy or alkylthio.

The substituents $R_1$ and $R_2$ have the meanings given for the formula I. The conversion of the aldehyde or keto function or acetals, acylals or ketals thereof, to the oxime of the formula II may take place in the stage of the intermediate products VII, IX, X, XIa or XIb in known manner by reaction with hydroxylammonium salts in the presence of one of the above mentioned acid binding agents. Examples of suitable hydroxylammonium salts include: hydroxylammonium chloride, acetate, sulphate, hydroxylamine-O-sulphonic acid, O-alkyl or O-acyl-hydroxylamino, O-carbamoyl-hydroxylamine.

The compounds of the formula XIa, with the exception of Q = CHO, i.e. when $R_4$ = H, can be oxidised to the corresponding sulphinyl or sulphonyl compounds with oxidants such, for example, as hydrogen peroxide or peracids, e.g. peracetic acid, perbenzoic acid.

The groupings

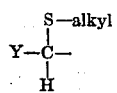

of the formula XIa or

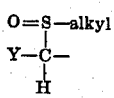

or

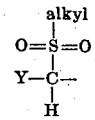

and

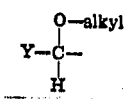

are denoted in the formulae I and II by the symbol $R_3$.

The active substances of the formula I are suitable for combating animal and plant pests of the most diverse kinds, but they act chiefly against all development stages, such as eggs, larves, nymphs, pupae and adults, of insects and representatives of the order Acarina, such as mites and ticks.

The compounds of the formula I may be used, for example, against the following insects or representatives of the order Acarina: Insects of the families:

*Teltigonidae*  *Tenebrionidae*
*Gryllidae*  *Chrysomelidae*
*Gryllotalpidae*  *Bruchidae*

—Continued

*Blattidae*  *Tineidae*
*Peduviidae*  *Noctindae*
*Phyrrhocoriae*  *Lymatriidae*
*Cimicidae*  *Pyralidae*
*Delphacidae*  *Culicidae*
*Aphididae*  *Tipulidae*
*Diaspididae*  *Stomoxydae*
*Pseudococcidae*  *Trypetidae*
*Scarabaeidae*  *Muscidae*
*Dermestidae*  *Calliphoridae* and
*Coccinellidae*  *Pulicidae*

Acarida of the families:
*Ixodidae*
*Argasidae*
*Tetranychidae* and
*Dermanyssidae*.

The insecticidal and/or acaricidal action can be substantially broadened and adapted to suit the particular circumstances by the addition of other insecticides and/or acaricides.

Suitable additives include, for example, the following active substances:

Bis-O,O-diethylphosphoric acid anhydride (TEPP)
Dimethyl-(2,2,2-trichloro-1-hydroxyethyl)-phosphonate (TRICHLORFON)
1,2-dibromo-2,2-dichloroethyldimethylphosphate (NALED)
2,2-dichlorovinyldimethylphosphate (DICHLORVOS)
2-methoxycarbamyl-1-methylvinyldimethylphosphate (MEVINPHOS)
Dimethyl-1-methyl-2-(methylcarbamoyl)-vinylphosphate cis (MONOCROTOPHOS)
3-(dimethoxyphosphinyloxy)-N,N-dimethyl-cis-crotonamide (DICROTOPHOS)
2-chloro-2-diethylcarbamoyl-1-methylvinyldimethyl-phosphate (PHOSPHAMIDON)
O,O-diethyl-O(or S)-2-(ethylthio)-ethylthiophosphate (DEMETON)
S-ethylthioethyl-O,O-dimethyl-dithiophosphate (THIOMETON)
O,O-diethyl-S-ethylmercaptomethyldithiophosphate (PHORATE)
O,O-diethyl-S-2-ethylthio)ethyldithiophosphate (DISULFOTON)
O,O-dimethyl-S-2-(ethylsulphinyl)ethylthiophosphate (OXYDEMETONMETHYL)
O,O-dimethyl-S-(1,2-dicarbethoxyethyldithiophosphate (MALATHION)
O,O,O,O-tetraethyl-S,S'-methylene-bis-dithiophosphate (ETHION)
O-ethyl-S,S-dipropyldithiophosphate
O,O-dimethyl-S-(N-methyl-N-formylcarbamoylmethyl)-dithiophosphate (FORMOTHION)
O,O-dimethyl-S-(N-methylcarbamoylmethyl)dithiophosphate (DIMETHOATE)
O,O-dimethyl-O-p-nitrophenylthiophosphate (PARATHION-METHYL)
O,O-diethyl-O-p-nitrophenylthiophosphate (PARATHION)
O-ethyl-O-p-nitrophenylphenylthiophosphate (EPN)

O,O-dimethyl-O-(4-nitro-m-tolyl)thiophosphate (FENITROTHION)
O,O-dimethyl-O-2,4-5-trichlorophenylthiophosphate (RONNEL)

O-ethyl-0,2,4,5-trichlorophenylethylthiophosphate (TRICHLORONATE)

O,O-dimethyl-O-2,5-dichloro-4-bromophenylthiophosphate (BROMOPHOS)

O,O-dimethyl-O-(2,5-dichloro-4-jodphenyl)-thiophosphate (JODOFENPHOS)

4-tert. butyl-2-chlorophenyl-N-methyl-O-methylamidophosphate (CRUFOMATE)

O,O-dimethyl-O-(3-methyl-4-methylmercaptophenyl)thiophosphate (FENTHION)

Isopropylamino-O-ethyl-O-(4-methylmercapto-3-methylphenyl)-phosphate

O,O-diethyl-O-p-(methylsulphinyl)phenyl-thiophosphate (FENSULFOTHION)

O-p-(dimethylsulphamido)phenyl-O,O-dimethylthiophosphate (FAMPHUR)

O,O,O',O'-tetramethyl-O,O'-thiodi-p-phenylenethiophosphate

O-ethyl-S-phenyl-ethyldithiophosphate

O,O-dimethyl-O-(α-methylbenzyl-3-hydroxy-crotonyl)phosphate 2-chloro-1-(2,4-dichlorophenyl)vinyl-diethylphosphate (CHLORFENVINPHOS)

1-chloro-1-(2,4,5-trichlorophenyl)vinyl-dimethylphosphate

O-[2-chloro-1-(2,5-dichlorophenyl)]vinyl-O,O-diethylthio-phosphate

Phenylglyoxylonitriloxim-O,O-diethylthiophosphate (PHOXIM)

O,O-diethyl-O-(3-chloro-4-methyl-2-oxo-2-H-1-benzopyran-7-yl)-thiophosphate (COUMAPHOS)

2,3-p-dioxandithiol-S,S-bis(O,O-diethyldithiophosphate) (DIOXATHION)

5-[(6-chloro-2-oxo-3-benzoxazolinyl)methyl]O,O-diethyldithio-phosphate (PHOSALONE)

2-(diethoxyphosphinylimino)-1,3-dithiolane

O,O-dimethyl-S-[2-methoxy-1,3,4-thiadiazol-5-(4H)-onyl-(4)-methyl]dithiophosphate O,O-dimethyl-S-phthalimidomethyl-dithiophosphate (IMIDAN)

O,O-diethyl-O-(3,5,6-trichloro-2-pyridyl)thiophosphate

O,O-diethyl-O-2-pyrazinylthiophosphate (THIONAZIN)

O,O-diethyl-O-(2-isopropyl-4-methyl-6-pyrimidyl)-thiophosphate (DIAZINON)

O,O-diethyl-O-(2-chinoxalyl)thiophosphate

O,O-dimethyl-S-(4-oxo-1,2,3-benzotriazin-3(4H)-ylmethyl)-dithiophosphate (AZINPHOS-METHYL)

O,O-diethyl-S-(4-oxo-1,2,3-benzotriazin-3(4H)-ylmethyl)-dithiophosphate (AZINPHOSETHYL)

S-[(4,6-diamino-s-triazin-2-yl)methyl]-O,O-dimethyldithiophosphate (MENAZON)

O,O-dimethyl-O-(3-chloro-4-nitrophenyl)thiophosphate (CHLORTHION)

O,O-dimethyl-O( or S)-2-(ethylthioethyl)thiophosphate (DEMETON-S-METHYL)

2-(O,O-dimethyl-phosphoryl-thiomethyl)-5-methoxy-pyron-4-3,4-dichlorobenzyl-triphenylphosphoniumchloride O,O-diethyl-S-(2,5-dichlorophenylthiomethyl)dithiophosphate (PHENKAPTON)

O,O-diethyl-O-(4-methyl-cumarinyl-7-)-thiophosphate (POTASAN)

5-amino-bis(dimethylamido)phosphinyl-3-phenyl-1,2,4-triazole (TRIAMIPHOS)

N-methyl-5-(O,O-dimethylthiolphosphoryl)-3-thiavaleramide (VAMIDOTHION)

O,O-diethyl-O-[2-diemthylamino-4-methylpyrimidyl-(6)]-thiophosphate (DIOCTHYL)

O,O-dimethyl-S-(methylcarbamoylmethyl)-thiophosphate (OMETHOATE)

O-ethyl-O-(8-quinolinyl)-phenylthiophosphonate (OXINOTHIOPHOS)

O-methyl-S-methyl-amidothiophosphate (MONITOR)

O-methyl-O-(2,5-dichloro-4-bromophenyl)-benzo-thiophosphate (PHOSVEL)

O,O,O,O-tetrapropyldithiophosphate 3-(dimethoxyphosphinyloxy)-N-methyl-N-methoxy-cis-crotonamide O,O-dimethyl-S-(N-ethylcarbamoylmethyl)dithiophosphate (ETHOATE-METHYL)

O,O-diethyl-S-(N-isopropylcarbamoylmethyl)-dithiophosphate (PROTHOATE)

S-N-(1-cyano-1-methylethyl)carbamoylmethyldiethylthiolphosphate (CYANTHOATE)

S-(2-acetamidoethyl)-O,O-dimethyldithiophosphate

Hexamethylphosphoric acid triamide (HEMPA)

O,O-dimethyl-O-(2-chloro-4-nitrophenyl)thiophosphate (DICAPTHON)

O,O-dimethyl-O-p-cyanophenyl thiophosphate (CYANOX)

O-ethyl-O-p-cyanophenylthiophosphonate

O,O-diethyl-O-2,4-dichlorophenylthiophosphate (DICHLORFENTHION)

0,2,4-dichlorophenyl-O-methylisopropylamidothiophosphate

O,O-diethyl-O-2,5-dichloro-4-bromophenylthiophosphate (BROMOPHOS-ETHYL)

Dimethyl-p-(methylthio)phenylphosphate

O,O-dimethyl-O-p-sulfamidophenylthiophosphate

O-[p-(p-chlorophenyl)azophenyl]O,O-dimethylthiophosphate (AZOTHOATE)

O-ethyl-S-4-chlorophenyl-ethyldithiophosphate

O-isobutyl-S-p-chlorophenyl-ethyldithiophosphate

O,O-dimethyl-S-p-chlorophenylthiophosphate

O,O-dimethyl-S-(p-chlorophenylthiomethyl)dithiophosphate

O,O-diethyl-p-chlorophenylmercaptomethyl-dithiophosphate (CARBOPHENOTHION)

O,O-diethyl-S-p-chlorophenylthiomethyl-thiophosphate

O,O-dimethyl-S-(carbethoxy-phenylmethyl)dithiophosphate (PHENTHOATE)

O,O-diethyl-S-(carbofluorethoxy-phenylmethyl)-dithiophosphate

O,O-dimethyl-S-carboisopropoxy-phenylmethyl)-dithiophosphate

O,O-diethyl-7-hydroxy-3,4-tetramethylene-coumarinyl-thiophosphate (COUMITHOATE)

2-methoxy-4-H-1,3,2-benzodioxaphosphorin-2-sulphide

O,O-diethyl-O-(5-phenyl-3-isooxazolyl)thiophosphate 2-(diethoxyphosphinylimino)-4-methyl-1,3-dithiolane Tris-(2-methyl-1-aziridinyl)-phosphine oxide (METEPA)
S-(2-chloro-1-phthalimidoethyl)-O,O-diethyldithiophosphate
N-hydroxynaphthalimido-diethylphosphate
Dimethyl-3,5,6-trichloro-2-pyridylphosphate
O,O-dimethyl-O-(3,5,6-trichloro-2-pyridyl)thiophosphate
S-2-(ethylsulphonyl)ethyl dimethylthiolphosphate (DIOXYDEMETON-S-METHYL)
Diethyl-S-2-(ethylsulphinyl)ethyl dithiophosphate (OXIDISULFOTON)
Bis-O,O-diethylthiophosphoric acid anhydride (SULFOTEP)
Dimethyl-1,3-di(carbomethoxy)-1-propen-2-yl-phosphate
Dimethyl-(2,2,2-trichloro-1-butyroyloxyethyl)phosphate (BUTONATE)
O,O-dimethyl-O-(2,2-dichloro-1-methoxyvinyl)phosphate
Bis-(dimethylamido)fluorphosphate (DIMEFOX)
3,4-dichlorobenzyl-triphenylphosphoniumchloride
Dimethyl-N-methoxymethylcarbamoylmethyl-dithiophosphate (FORMOCARBAM)
O,O-diethyl-O-(2,2-dichloro-1-chloroethoxyvinyl)-phosphate
O,O-dimethyl-O-(2,2-dichloro-1-chloroethoxyvinyl)phosphate
O-ethyl-S,S-diphenyldithiolphosphate
O-ethyl-S-benzyl-phenyldithiophosphonate
O,O-diethyl-S-benzyl-thiolphosphate
O,O-dimethyl-S-(4-chlorophenylthiomethyl)dithiophosphate (METHYLCARBOPHENOTHION)
O,O-dimethyl-S-(ethylthiomethyl)dithiophosphate
Diisopropylaminofluorophosphate (MIPAFOX)
O,O-dimethyl-S-(morpholinylcarbamoylmethyl)dithiophosphate (MORPHOTHION)
Bismethylamido-phenylphosphate
O,O-dimethyl-S-(benzene sulphonyl)dithiophosphate
O,O-dimethyl-(S and O)-ethylsulphinylethylthiophosphate
O,O-diethyl-O-4-nitrophenylphosphate
Triethoxy-isopropoxy-bis(thiophosphinyl)disulphide 2-methoxy-4H-1,3,2,benzodioxaphosphorin-2-oxide
Octamethylpyrophosphoramide (SCHRADAN)
Bis (dimethoxythiophospphinylsulphido)-phenylmethane
N,N,N',N'-tetramethyldiamidofluorophosphate (DIMEFOX)
O-phenyl-O-p-nitrophenyl-methanthiophosphonate (COLEP)
O-methyl-O-(2-chloro-4-tert.butyl-phenyl)-N-methylamidothiophosphate (NARLENE)
O-ethyl-O-(2,4-dichlorophenyl)-phenylthiophosphonate
O,O-diethyl-O-(4-methylmercapto-3,5-dimethylphenyl)-thiophosphate
4,4'-bis-(O,O-dimethylthiophosphoryloxy)-diphenyl disulphide
O,O-di-($\beta$-chloroethyl)-O-(3-chloro-4-methyl-coumarinyl-7)-phosphate
S-(1-phthalimidoethyl)-O,O-diethyldithiophosphate
O,O-dimethyl-O-(3-chloro-4-diethylsulphamylphenyl)-thiophosphate
O-methyl-O-(2-carbisopropoxyphenyl)-amidothiophosphate
5-(O,O-dimethylphosphoryl)-6-chloro-bicyclo(3.2.0)-heptadiene(1,5)
O-methyl-O-(2-i-propoxycarbonyl-1-methylvinyl)-ethylaminothiophosphate.

Nitrophenols and derivatives 4,6-dinitro-6-methylphenol, Na-salt [Dinitrocresol]
dinitrobutylphenol-(2,2',2''-triethanolamine salt
2-cyclohexyl-4,6-dinitrophenyl [Dinex]
2-(1-methylheptyl)-4,6-dinitrophenyl-crotonate [Dinocap]
2-sec.-butyl-4,6-dinitrophenyl-3-methyl-butenoate [Binapacryl]
2-sec.-butyl-4,6-dinitrophenyl-cyclopropionate
2-sec.-butyl-4,6-dinitrophenylisopropylcarbonate [Dinobuton]

Miscellaneous pyrethin I
pyrethin II
3-allyl-2-methyl-4-oxo-2-cyclopentan-1-yl-chrysanthemumate (Allethrin)
6-chloripéronyl-chrysanthemumate (Barthrin)
2,4-dimethylbenzyl-chrysanthemumate (Dimethrin)

2,3,4,5-tetrahydrophthalimidomethylchrysanthemumate
4-chlorobenzyl-4-chlorophenylsulphide [Chlorobensid]
6-methyl-2-oxol, 3-dithiolo-[4,5-b]-quinoxaline (Quinomethionate)
(I)-3-(2-furfuryl)-2-methyl-4-oxocyclopent-2-enyl(1)-(cis+trans)-chrysanthemum-monocarboxylate [Furethrin]
2-pivaloyl-indane-1,3-dione [Pindon]
N'-(4-chloro-2-methylphenyl)-N,N-dimethylformamidine [Chlorophenamidin]
4-chlorobenzyl-4-fluorophenyl-sulphide [Fluorobenside]
5,6-dichloro-1-phenoxycarbanyl-2-trifluoromethyl-benzimidazole [Fenoxaflor]
p-chlorophenyl-p-chlorobenzenesulphonate [Ovex]
p-chlorophenyl-benzenesulphonate [Fenson]
p-chlorophenyl-2,4,5-trichlorophenylsulphone [Tetradifon]
p-chlorophenyl-2,4,5-trichlorophenylsulphide [Tetrasul]
p-chlorobenzyl-p-chlorophenylsulphide ]Chlorobenside]
2-thio-1,3-dithiolo-(,5,6)-quinoxaline [Thiochinox]
prop-2-ynyl-(4-t-butylphenoxy)-cyclohexylsulphite [Propargil].

Formamidines 1-dimethyl-2-(2'-methyl-4'-chlorophenyl)-formamidine (CHLORPHENAMIDIN)
1-methyl-2-(2'-methyl-4'-chlorophenyl)-formamidine
1-methyl-2-(2'-methyl-4'-bromophenyl)-formamidine
1-methyl-2-(2'-dimethylphenyl)-formamidine
1-n-butyl-1-methyl-2-(2'-methyl-4'-chlorophenyl)-formamidine
1-methyl-1-(2'-methyl-4'-chloroaniline-methylene)-formamidine 2-(2''-methyl-4''-chlorophenyl)-formamidine
1-n-butyl-2-(2'-methyl-4'-chlorophenyl-imino)-pyrolidine.

Urea

N-2-methyl-4-chlorophenyl-N',N'-dimethyl-thiourea.

Carbamate 1-naphthyl-N-methylcarbamate (CARBARYL)
2-butinyl-4-chlorophenylcarbamate
4-dimethylamino-3,5-xylyl-N-methylcarbamate
4-dimethylamino-3-tolyl-N-methylcarbamate (AMINOCARB)
4-methylthio-3,5-xylyl-N-methylcarbamate (METHIOCARB)
3,4,5-trimethylphenyl-N-methylcarbamate
2-chlorophenyl-N-methylcarbamate (CPMC)
5-chloro-6-oxo-2-norborane-carbonitrile-O-)methylcarbamoyl)-oxime
1-(dimethylcarbamoyl)-5-methyl-3-pyrazolyl-N,N-dimethylcarbamate (DIMETILAN)
2,3-dihydro-2,2-dimethyl-7-benzofuranyl-N-methylcarbamate (CARBOFURAN)
2-methyl-2-methylthio-propionaldehyde-O-(methylcarbamoyl)-oxime (ALDICARB)
8-chinaldyl-N-methylcarbamate and their salts
methyl 2-isopropyl-4-(methylcarbamoyloxy)carbanilate
m-(1-ethylpropyl)phenyl-N-methylcarbamate
3,5-di-tert.butyl-N-methylcarbamate
m-(1-methylbutyl)phenyl-N-methylcarbamate
2-isopropylphenyl-N-methylcarbamate
2-sec.butylphenyl-N-methylcarbamate
m-tolyl-N-methylcarbamate
2,3-xylyl-N-methylcarbamate
3-isopropylphenyl-N-methylcarbamate
3-tert.butylphenyl-N-methylcarbamate
3-sec.butylphenyl-N-methylcarbamate
3-isopropyl-5-methylphenyl-N-methylcarbamate (PROMECARB)
3,5-diisopropylphenyl-N-methylcarbamate
2-chloro-5-isopropylphenyl-N-methylcarbamate
2-chloro-4,5-dimethylphenyl-N-methylcarbamate
2-(1,3-dioxolan-2-yl)phenyl-N-methylcarbamate (DIOXACARB)
2-(4,5-dimethyl-1,3-dioxolan-2-yl)phenyl-N-methylcarbamate
2-(1,3-dioxolan-2-yl)phenyl-N,N-dimethylcarbamate
2-(1,3-dithiolan-2-yl)-N,N-dimethylcarbamate
2-(1,3-dithiolan-2-yl)phenyl-N,N-dimethylcarbamate
2-isopropoxyphenyl-N-methylcarbamate (APROCARB)
2-(2-propinyloxy)phenyl-N-methylcarbamate
3-(2-propinyloxy)phenyl-N-methylcarbamate
2-dimethylaminophenyl-N-methylcarbamate
2-diallylaminophenyl-N-methylcarbamate
4-diallylamino-3,5-xylyl-N-methylcarbamate (ALLYXICARB)
4-benzothienyl-N-methylcarbamate
2,3-dihydro-2-methyl-7-benzofuranyl-N-methylcarbamate
3-methyl-1-phenylpyrazol-5-yl-N,N-dimethylcarbamate 1-isopropyl-3-methylpyrazol-5-yl-N,N-dimethylcarbamate (ISOLAN)
2-dimethylamino-5,6-dimethylpyrimidin-4-yl-N,N-dimethyl-carbamate
3-methyl-4-dimethylaminomethyleneiminophenyl-N-methylcarbamate
3-dimethylamino-methyleneiminophenyl-N-methylcarbamate (FORMETANATE) and their salts
1-methylthio-ethylimino-N-methylcarbamate (METHOMYL)
2-methylcarbamoyloximino-1,3-dithiolane
5-methyl-2-methylcarbamoyloximino-1,3-oxythiolane
2-(1-methoxy-2-propoxy)phenyl-N-methylcarbamate
2-(1-butin-3-yl-oxy)phenyl-N-methylcarbamate
1-dimethylcarbamyl-1-methylthio-O-methylcarbamyl-formoxime
1-(2'-cyanoethylthio)-O-methylcarbamyl-acetaldoxime
1-methylthio-O-carbamyl-acetaldoxime
O-(3-sec.butylphenyl)-N-phenylthio-N-methylcarbamate
2,5-dimethyl-1,3-dithioland-2-(O-methylcarbamyl)-aldoxime)
O-2-diphenyl-N-methylcarbamate
2-(N-methylcarbamyl-oximino)-3-chloro-bicyclo[2.2.1]heptane
2-(N-methylcarbamyl-oximino)-bicyclo[2.2.1]heptane
3-isopropylphenyl-N-methyl-N-chloroacetyl-carbamate
3-isopropylphenyl-N-methyl-N-methylthiomethyl-carbamate
O-(2,2-dimethyl-4-chloro-2,3-dihydro-7-benzofuranyl)-N-methylcarbamate
O-(2,2,4-trimethyl-2,3-dihydro-7-benzofuranyl)-N-methylcarbamate
O-naphthyl-N-methyl-N-acetyl-carbamate
O-5,6,7,8-tetrahydronaphthyl-N-methyl-carbamate
3-isopropyl-4-methylthio-phenyl-N-methylcarbamate
3,5-dimethyl-4-methoxy-phenyl-N-methylcarbamate 3-methoxymethoxy-phenyl-N-methylcarbamate
3-allyloxyphenyl-N-methylcarbamate
2-propargyloxymethoxy-phenyl-N-methyl-carbamate 2-allyloxyphenyl-N-methyl-carbamate
4-methoxycarbonylamino-3-isopropylphenyl-N-methyl-carbamate
3,5-dimethyl-4-methoxycarbonylamino-phenyl-N-methyl-carbamate
2-γ-methylthiopropylphenyl-N-methyl-carbamate
3-(α-methoxymethyl-2-propenyl)-phenyl-N-methyl-carbamate
2-chloro-5-tert.-butyl-phenyl-N-methyl-carbamate
4-(methyl-propargylamino)-3,5-xylyl-N-methyl-carbamate
4-(methyl-γ-chloroallylamino)-3,5-xylyl-N-methyl-carbamate
4-(methyl-β-chloroallylamino)-3,5-xylyl-N-methyl-carbamate
1-(β-ethoxycarbonalethyl)-3-methyl-5-pyrazolyl-N,N-dimethylcarbamate 3-methyl-4-(dimethylamino-methylmercapto-
  methyleneimino)phenyl-N-methylcarbamate
1,3-bis(carbamoylthio)-2-(N,N-dimethylamino)-
  propanehydrochloride
5,5-dimethylhydroresorcinoldimethylcarbamate
2-[ethyl-propargylamino]-phenyl-N-
  methylcarbamate
2-[methyl-propargylamino]-phenyl-N-
  methylcarbamate
2-[dipropargylamino]-phenyl-N-methylcarbamate
4-[dipropargylamino]-3-tolyl-N-methylcarbamate
4-[dipropargylamino]-3,5-xylyl-N-methylcarbamate
2-[allyl-isopropylamino]-phenyl-N-methylcarbamate
3-[allyl-isopropylamino]-phenyl-N-methylcarbamate Chlorinated Hydrocarbons γ-hexachlorocyclohexane [GAMMEXANE; LINDAN; γ HCH]
1,2,4,5,6,7,8,8-octachloro-3α,4,7,7α'tetrahydro-4,7-methylene-indane [CHLORDAN]
1,4,5,6,7,8,8-heptachloro,3α,4,7,7α-tetrahydro-4,7-methylen-indane [HEPTACHLOR]
1,2,3,4,10,10-hexachloro-1,4,4α,5,8,8α-hexahydro-endo-1,4-exo-5,8-dimethanonaphthalene [ALDRIN]
1,2,3,4,10,10-hexachloro-6,7-epoxy-1,4,4α,5,6,7,8,8α-oxtahydro-exo-1,4-endo-5,8-dimethanonaphthalene [DIFLORIN]
1,2,3,4,10,10-hexachloro-5,7-epoxy-1,4,4α,5,6,7,8,8α-octy-hydro-endo-endo-5,8-dimethanonaphthalene [ENDRIN]

In addition to the cited insecticides and acaricides, the compounds of the formula I may also be formulated with other fungicides, fungistatic or bacteriostatic agents in various mixture ratios, in which case compound mixtures are formed which possess advantages over the individual components. The following, for example, are suitable for formulating with the active substances of the formula I:

dodecylquanidine acetate (DODINE)
pentachloronitrobenzene (QUINTOZENE)
pentachlorophenol (PCP)
2-(1-methyl-n-propyl)-4,6-dinitrophenyl-2-methyl-crotonate (BINAPACRYL)
2-(1-methyl-n-heptyl)-4,6-dinitrophenylcrotonate (DINOCAP)
2,6-dichloro-4-nitroaniline (DICHLORAN)
2,3,5,6-tetrachloro-benzoquinone (1,4) (CHLORANIL)
2,3-dichloro-naphthoquinone (1,4) (DICHLONE)
N-(trichloromethylthio) phthalimide (FOLPAT)
N-(trichloromethylthio) cyclohex-4-en-1,2-dicarboximide (CAPTAN)
N-(1,1,2,2-tetrachloroethylthio)cyclohex-4-en-1,2-dicarboximide (CAPTAFOL)
N-methansulfonal-N-trichloromethylthio-chloroaniline
N'-dichlorofluoromethylthio-N,N-dimethyl-N'-phenylsulfamide (DICHLOFLUANID)
O-ethyl-S-benzyl-phenyldithiophosphate
O,O-diethyl-S-benzyl-thiolphosphate
disodium-ethylene-1,2-bis-dithiocarbamate (NABAM)
zinc-ethylene-1,2-bis-dithiocarbamate (ZINEB)
manganese-ethylene-1,2-bis-dithiocarbamate (polymeric) (MANEB)
tetramethylthiuramdisulfide (THIRAM)
1-oxy-3-acetyl-6-methyl-cyclohexene-(5)dione-(2,4) (DEHYDROACETIC ACID)
8-hydroxyquinoline (8-QUINOLINOL)
2-dimethylamino-6-methyl-5-n-butyl-4-hydroxy-pyrimidine
methyl-N-benzimidazole-2-yl-N-(butylcarbamoyl)-carbamate (BENOMYL)
2-ethylamino-6-methyl-5n-butyl-4-hydroxypyrimidine
2,3-dicyano-1,4-dithia-anthraquinone (DITHIANON)
2-(4-thiazolyl)-benzimidazole
3,5-dimethyltetrahydro-1,3,5-thiodiazine-2-thione (DAZOMET)
2,3-dihydro-5-carboxanilido-6-methyl-1,4-oxathine
pentachlorobenzyl alcohol.

The compounds of the formula I may be used as pure active substance or together with suitable carriers and-/or additives. Suitable carriers and additives can be solid or liquid and correspond to the substances conventionally used in formulation technique such, for example, as solvents dispersants, wetting agents, adhesives, thickeners, binders and/or fertilisers.

For application, the compounds of the formula I may be processed to dusts, emulsion concentrates, granules, dispersions, sprays, to solutions, or suspensions in the conventional formulation which is commonly employed in application terminology. Mention may also be made of "cattle dips" and "spray races," in which aqueous preparations are used.

The agents according to the invention are manufactured in known manner by intimately mixing and/or grinding active substances of the formula I with the suitable carriers, optionally with the addition of dispersants or solvents which are inert towards the active substances. The active substances may be available and can be used in the following forms: Solid forms:

Dusts, tracking agents, granules, coated granules, impregnated granules and homogeneous granules. Liquid forms:

a. active substances which are dispersible in water: wettable powders, pasts, emulsions;

b. solutions.

To manufacture solid forms (dusts, tracking agents), the active substances are mixed with solid carriers. Suitable carriers are, for example: kaolin, talcum, bolus, loess, chalk, limestone, ground limestone, attaclay, dolomite, diatomaceous earth, precipitated silica, alkaline earth silicates, sodium and potassium aluminium silicates (feldspar and mica), calcium and magnesium sulphates, magnesium oxide, ground synthetic materials, fertilisers, for example ammonium sulphate, ammonium phosphate, ammonium nitrate, urea, ground vegetable products, such as corn meal, bark dust, sawdust, nutshell meal, cellulose powder, residues of plant extractions, activated charcoal etc. These substances can either be used alone or in admixture with one another.

Granules can be very easily manufactured by dissolving an active substance of the formula I in an organic solvent and applying the resulting solution to a granulated material, for example attapulgite, $SiO_2$, granicalcium, bentonite etc. and then evaporating the solvent.

Polymer granules can also be manufactured by mixing the active substances of the formula I with polymerisable compounds (urea/formaldehyde; dicyandiamide/formaldehyde; melamine/formaldehyde or others), whereupon a mild polymerisation is carried out that does not affect the active substances and in the process of which the granulation is carried out during the gel formation. It is more advantageous to impregnate finished, porous polymer granules (urea/formaldehyde, polyacrylonitrile, polyester or others) which have a specific surface area and a favourable predeterminable adsorption/desorption ratio, with the active substances, for example in the form of their solutions (in a low boiling solvent) and to remove the solvent. Polymer granules of this kind in the form of microgranules having a bulk density of 300 g/litre to 600 g/litre can also be manufactured with the aid of atomisers. The dusting can be carried out from aircraft over extensive areas of cultures of useful plants.

It is also possible to obtain granules by compacting the carrier with the active substance and carriers and subsequently comminuting the product.

To these mixtures can also be added additives which stabilize the active substance and/or non-ionic, anionic and cationic surface active substances, which for example improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivates (methyl cellulose, carboxymethyl cellulose), hydroxyethyl glycol ethers of monoalkyl and dialkyl phenols having 5 to 15 ethylene oxide radicals per molecule and 8 to 9 carbon atoms in the alkyl radical, lignin sulphonic acids, their alkali metal and alkaline earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide/propylene oxide, polyvinyl pyrrolidones, polyvinyl alcohols, condensation products of urea and formaldehyde, and also latex products.

The water-dispersible concentrates of the active substance, i.e. wettable powders, pastes and emulsifiable concentrates, are agents which can be diluted with water to any concentration desired. They consist of active substance, carrier, optionally additives which stabilize the active substance, surface-active substance and anti-foam agents and, optionally, solvents.

Wettable powder and pastes are obtained by mixing and grinding the active substances with dispersing agents and pulverulent carriers in suitable apparatus until homogeneity is attained. Carriers are, for example, those mentioned for the solid forms of application. In some cases it is advantageous to use mixtures of different carriers. As dispersing agents there can be used, for example, condensation products of sulfonated naphthalene and sulfonated naphthalene derivatives with formaldehyde, condensation products of naphthalene or naphthalene sulfonic acids with phenol and formaldehyde, as well as alkali, ammonium and alkaline earth metal salts of lignin sulfonic acid, in addition, alkylaryl sulfonates, alkali and alkaline earth metal salts of dibutyl naphthalene sulfonic acid, fatty alcohol sulfates such as salts of sulfated hexadecanols, heptadecanols, octadecanols, and salts of sulfated fatty alcohol glycol ethers, the sodium salt of oleoyl ethionate, the sodium salt of oleoyl methyl tauride, ditertiary acetylene glycols, dialkyl dilauryl ammonium chloride and fatty acid alkali and alkaline earth metal salts.

Suitable anti-foam agents are silicones.

The active substances are mixed, ground, sieved and strained with the additives mentioned above that, in wettable powder, the solid particle size of from 0.02 to 0.04 and in pastes, of 0.03 is not exceeded. To produce emulsifiable concentrates and pastes, dispersing agents such as those cited above, organic solvents and water are used. Examples of suitable solvents are the following: alcohols, benzene, xylene, toluene, dimethyl sulfoxide, and mineral oil fractions boiling between 120° and 350°C. The solvents must be practically odorless, not phytotoxic, inert to the active substances and not readily inflammable.

Furthermore, the agents according to the invention can be applied in the form of solutions. For this purpose the active substance or several active substances of the general formula I are dissolved in suitable organic solvents, mixtures of solvents or in water. Aliphatic and aromatic hydrocarbons, chlorinated derivatives thereof, alkyl naphthalenes, and mineral oils alone or mixed with each other, can be used as organic solvents.

The content of active substance in the above described agents is between 0.1 to 95 percent, in which connection it should be mentioned that in the case of application from aircraft or some other suitable means of application, it is possible to use concentrations of up to 99.5 percent or even pure active substance.

The active substances of the formula I can, for example, be formulated as follows:

Dusts

The following substances are used to manufacture a) a 5 percent and b) a 2 percent dust:

```
a)      5  parts of active substance
       95  parts of talcum
b)      2  parts of active substance
        1  part of highly disperse silica
       97  parts of talcum.
```

The active substances are mixed with the carriers and ground.

Granules

The following substances are used to produce 5 percent granules:

```
 5     parts of active substance,
 0.25  parts of epichlorohydrin,
 0.25  parts of cetyl polyglycol ether,
 3.50  parts of polyethylene glycol,
91     parts of kaolin (particle size 0.3–0.8 mm).
```

The active substance is mixed with epichlorohydrin and dissolved with 6 parts of acetone; the polyethylene glycol and cetyl polyglycol ether are then added. The thus obtained solution is sprayed on to kaolin, and the acetone subsequently evaporated in vacuo.

Wettable powder:

The following constituents are used for the preparation of a) a 40 percent, b) and c) a 25 percent, and d) a 10 percent wettable powder:

```
a)  40    parts of active substance,
     5    parts of sodium lignin sulphonate,
     1    part of sodium dibutyl-naphthalene sulphonate,
    54    parts of silica acid.
b)  25    parts of active substance,
     4.5  parts of calcium lignin sulphonate
     1.9  parts of Champagne chalk/hydroxyethyl cellulose
```

| | | mixture (1:1), |
|---|---|---|
| | 1.5 | parts of sodium dibutyl naphthalene sulphonate, |
| | 19.5 | parts of silica acid, |
| | 19.5 | parts of Champagne chalk, |
| | 28.1 | parts of kaolin. |
| c) | 25 | parts of active substance, |
| | 2.5 | parts of isooctylphenoxy-polyoxyethylene-ethanol, |
| | 1.7 | parts of Champagne chalk/hydroxyethyl cellulose mixture (1:1), |
| | 8.3 | parts of sodium aluminium silicate, |
| | 16.5 | parts of kieselguhr, |
| | 46 | parts of kaolin. |
| d) | 10 | parts of active substance, |
| | 3 | parts of a mixture of the sodium salts of saturated fatty alcohol sulphates, |
| | 5 | parts of naphthalenesulphonic acid/formaldehyde condensate, |
| | 82 | parts of kaolin. |

The active substances are intimately mixed, in suitable mixers, with the additives, the mixture being then ground in the appropriate mills and rollers. Wettable powder are obtained which can be diluted with water to give suspensions of any desired concentration.

Emulsifiable concentrates

The following substances are used to produce a) a 10 percent and b) a 25 percent emulsifiable concentrate:

| a) | 10 | parts of active substance, |
|---|---|---|
| | 3.4 | parts of epoxidised vegetable oil, |
| | 13.4 | parts of a combination emulsifier consisting of fatty alcohol polyglycol ether and alkylarylsulphonate calcium salt, |
| | 40 | parts of dimethylformamide, |
| | 43.2 | parts of xylene. |
| b) | 25 | parts of active substance, |
| | 2.5 | parts of epoxidised vegetable oil, |
| | 10 | parts of an alkylarylsulphonate/fatty alcohol-polyglycol ether mixture |
| | 5 | parts of dimethylformamide, |
| | 57.5 | parts of xylene. |

From these concentrates it is possible to produce, by dilution with water, emulsion of any desired concentration.

Spray

The following constituents are used to prepare a 5% spray:

| 5 | parts of active substance, |
|---|---|
| 1 | part of epichlorohydrin, |
| 94 | parts of benzine (boiling limits 160°–190°C). |

EXAMPLE 1

2-methoxymethyl-2-methylthio-N-methyl-carbamoyl-propaldoxime a) 2-methylthio-2-chloromethyl-propionaldehyde To a solution of 70.1 g of methacrolein in 300 ml of dichloromethane are added at −5° to 0°C and within 20 minutes 82.5 g of methylsulphenyl chloride (prepared from dimethyl disulphide and $SO_2Cl_2$ or $Cl_2$) in 220 ml of dichloromethane. The reaction is slightly exothermic. The reaction mixture is then boiled under reflux for 1 hour at 38°–40°C. The 2-methylthio-2-chloromethylpropanal boils in fractional distillation at 43°–45°C/1 mm Hg.

b) 2-methyoxymethyl-2-methylthio-propanol-dimethylacetal 91.5 g of 2-methylthio-2-chloromethylpropanal are charged into 300 ml of absolute methanol. The internal temperature rises to 35°C and a clear yellow solution forms. This solution is stirred for 1 hour at 20°–30°C and then treated at 0°C within 20 minutes with 35 g of sodium methylate in 130 ml of methanol. The mixture is stirred for 15 hours at 20°C, in the course of which sodium chloride is precipitated. The sodium chloride is filtered off and the subsequent fractional distillation yields the 2-methoxy-methyl-2-methyl-thiopropanal-dimethylacetal at 64°C–65°C/1.2 mm Hg.

c) 2-methoxymethyl-2-methylthiopropaldoxime

To a solution of 58.2 g of 2-methoxymethyl-2-methylthio-propanal-dimethylacetal in 100 ml of 1.4 dioxan and 30 ml of water is added at 20°C a solution of 20.9 g of $NH_2OH \cdot HCl$ in 50 ml of water in such a way that the solution does not become turbid. The addition lasts about 30 minutes. The clear, pale yellow solution is stirred for 20 hours at room temperature and then neutralised with 50 ml of conc. sodium bicarbonate solution. The subsequently completely concentrated solution is taken up in 300 ml of dichloromethane and extracted 3 times with 100 ml of water on each occasion. The dichloromethane phase is dried over sodium sulphate and completely concentrated, to leave as residue liquid 2-methoxy-2-methylthiopropaldoxime, which is further processed without additional purification to give the active substance of the formula

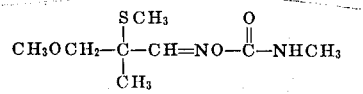

d) 3-methoxy-2-methyl-2-methylthio-N-methyl-carbamoyl-propaldoxime

To a solution of 47.2 g of 2-methoxymethyl-2-methylthio-propaldoxime in 80 ml of dimethyl sulphoxide is added 0.5 ml of triethylamine and then 2.5 g of methyl isocyanate are added dropwise within 10 minutes. The temperature rises from 20° to 25°C. The clear solution is stirred for 20 hours at room temperature, treated with 150 ml of water and extracted with 4 × 100 ml of dichloromethane. The combined dichloromethane phases are washed with 3 × 50 ml of water and dried over sodium sulphate. The solvent is distilled off to leave as residue a viscose oil. This oil is dissolved in 150 ml of diethyl ether, the solution treated with 60 ml of petroleum ether (b.p. 40°–70°C) and cooled to −70°C. The precipitated crystals are filtered off, washed with petroleum ether and dried, to give the active substance No. 1 of the formula

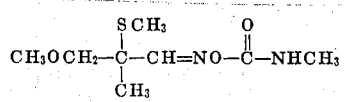

with a melting point of 58°–60°C.

EXAMPLE 2

3-methyoxy-2-methylsulphonyl-2-methyl-N-methylcarbamoyl-propaldoxime

To 22 g of 3-methoxy-2-methylthio-2-methyl-N-methyl-carbamoyl-propaldoxime 100 ml of glacial acetic acid are added dropwise at 30°–35°C and within 30 minutes 41.8 g of peracetic acid (40 percent) in 30 ml of ethyl acetate. After being stirred for 4 hours, the clear solution is treated with 100 ml of ice water and extracted with 3 × 100 ml of ethyl acetate. The combined ethyl acetate phases are dried over sodium sulphate and concentrated. Recrystallisation twice from ethyl acetate/petroleum ether (40°–70°C) yields the active substance of the formula

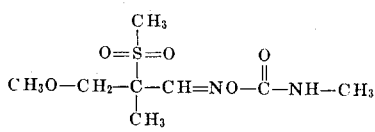

with a melting point of 98°–100°C.

EXAMPLE 3

3,3-diethoxy-2-methylthio-2-methyl-N-methylcarbamoyl-propaldoxime a) 3-ethoxy-2-methylacrolein-oxime To a solution of 250 g of hydroxyammonium chloride and 342 g of 3-ethoxy-2-methylacrolein in 2.25 litres of ethanol are added dropwise 284 g of pyridine in such a way that the temperature always remains between 20°–25°C. The reaction mixture is left to stand for 14 hours of room temperature, then concentrated at 40°C/11 mm Hg, and the residual yellow oil is treated with 1.2 litres of ice water. The crude 3-ethoxy-2-methyl-acrolein-oxime which crystallises out is filtered off, dried and may be used direct for further reaction. Recrystallisation from cyclohexane yields white crystals of 3-ethoxy-2-methylacrolein-oxime with a melting point of 74°C–80°C.

b) 3-ethoxy-2-methyl-N-methylcarbamoyl-propaldoxime

To a solution of 25.8 g of 3-ethoxy-2-methylacrolein oxime and 0.2 ml of triethylamine in 220 ml of methylene chloride are added dropwise at 20°–25°C 11.9 g of methyl isocyanate in 50 ml of methylene chloride. The reaction mixture is left to stand for 14 hours at room temperature and then evaporated in vacuo. Recrystallisation of the white residue in alcohol yields 3-ethoxy-2-methyl-N-methyl-carbamoyl-propaldoxime with a melting point of 118.5°–120°C.

c) 3,3-diethoxy-2-methylthio-2-methyl-N-methylcarbamoyl-propaldoxime

To a solution of 18.6 g if 3-ethoxy-2-methyl-N-methylcarbamoyl-propaldoxime in 150 ml of methylene chloride is added dropwise at −20°C a solution of methane-sulphenyl chloride (prepared at −20°C from 5.17 g of dimethyl disulphide and 7.4 g of sulphenyl chloride in 50 ml of methylene chloride).

Upon completion of the addition, the mixture is left for 1½ hours at 0°C and then a solution of 2.3 g of sodium in 50 ml of absolute ethanol is added dropwise at 0°C.

The reaction mixture is left to stand for 14 hours at room temperature. The precipitate which has formed is filtered off and the filtrate evaporated. The residual pale yellow oil is taken up in 200 ml of methylene chloride, and the solution is washed with 50 ml of water and dried over sodium sulphate, to give the active substance of the formula

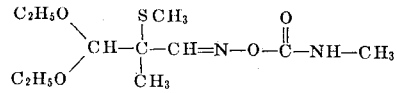

in the form of a viscous oil with a refractive index $n^{20}_D$ of 1.4934.

EXAMPLE 4

2-methylthiomethyl-2-methylthio-propanal-diethyl acetal a) 61.2 g of 2-methylthio-2-propanal-diethyl acetal A mixture is prepared at 50°C of 61.2 g of 2-methylthio-2-chloromethylpropanal (Example 1a) and 2 drops of conc. $H_2SO_4$ and 62.5 g of ortho-formic acid triethyl ether are added thereto at 50°–60°C within 20 minutes. The solution is stirred for 1 hour at 70°C and then distilled, to give 80 g of liquid of the formula

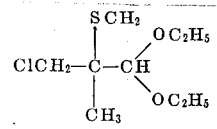

with a boiling point of 52°–54°C/0.15 mm Hg.

b) 2-methylthiomethyl-2-methylthio-propanal-diethyl acetal

To a solution of 7 g of sodium in 150 ml of ethanol are added 14.6 g of methyl mercaptan. Then 67.8 g of 2-chloromethyl-2-methylthio-propanal-diethyl acetal are added within 20 minutes at 20°–25°C and the suspension is stirred for 6 hours at room temperature. The alcohol is completely evaporated off, the residue taken up in 400 ml of $CH_2Cl_2$ and the solution is washed with 2 × 100 ml of NaOH and of water, then dried and evaporated to give 69 g of pale yellow substance of the formula

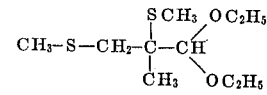

Analogous to Example 1 c) and d), this substance is processed to 2-methylthiomethyl-2-methylthio-N-methyl-carbamoyl-propaldoxime.

The following compounds are also manufactured analogous to Examples 1–4:

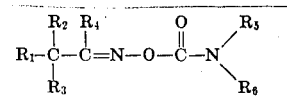

| $R_1$ | $R_2$ | $R_3$ | $R_4$ | $R_5$ | $R_6$ | Physical data |
|---|---|---|---|---|---|---|
| $CH_3S-$ | $-CH_3$ | $-CHO$ | H | H | $-CH_3$ | $n_D^{20}$ 1.4935. |
| $CH_3S-$ | $CH_3$ | $-CH_2OCH_3$ | H | H | $-CH_2-CH=CH_2$ | $n_D^{20}$ 1.5074. |
| $CH_3S-$ | $-CH_3$ | $-CH_2OCH_3$ | H | H | $-C_2H_5$ | 30–40° C. |
| $CH_3S-$ | $-CH_3$ | $-CH_2-OCH_2CH_3$ | H | H | $-CH_3$ | Fp. 76–78° C. |
| $CH_3S-$ | $-CH_3$ | $-CH_2-SCH_3$ | H | H | $-CH_2-CH=CH_2$ | Smp. 53–55° C. |
| $CH_3S-$ | $-CH_3$ | $-CH_2-OC_2H_5$ | H | H | $-CH_2-CH=CH_2$ | Smp. 34–36° C. |
| $CH_3S-$ | $-CH_3$ | $-CH_2-SC_2H_5$ | H | H | $-CH_3$ | Smp. 50–53° C. |
| $CH_3S-$ | $-CH_3$ | $-CH_2-OCH_2-CH=CH_2$ | H | H | $-CH_3$ | $n_D^{27°}$ 1.511. |
| $CH_3S-$ | $-CH_3$ | $-CH_2Cl$ | H | H | $-CH_3$ | Smp. 39–40° C. |

Table – Continued

| R₁ | R₂ | R₃ | R₄ | R₅ | R₆ | Physical data |
|---|---|---|---|---|---|---|
| $CH_3-\underset{\underset{O}{\|}}{S}-$ | —CH₃ | —CH₂OCH₃ | H | H | CH₃ | |
| CH₃—S— | —CH₃ | —CH₂OCH₃ | H | H | —C₂H₅ | |
| CH₃—S— | —CH₃ | —CH₂OCH₃ | H | —CH₃ | $-\underset{\underset{O}{\|\|}}{C}-CH_3$ | |
| CH₃—S— | —CH₃ | —CH₂OCH₃ | H | H | —CH₂—CH=CH₂ | |
| $CH_3-\underset{\underset{O}{\|}}{S}-$ | —CH₃ | —CH₂OCH₃ | H | —CH₃ | $-\underset{\underset{O}{\|\|}}{C}-CH_3$ | |
| $CH_3-\underset{\underset{O}{\|}}{\overset{\overset{O}{\|}}{S}}-$ | —CH₃ | —CH₂OCH₃ | H | —CH₃ | $-\underset{\underset{O}{\|\|}}{C}-CH_3$ | |
| $CH_3\underset{\underset{O}{\|}}{S}-$ | —CH₃ | —CH₂—OCH₂CH₃ | H | H | —CH₃ | |
| $CH_3\underset{\underset{O}{\|}}{\overset{\overset{O}{\|}}{S}}-$ | —CH₃ | —CH₂OCH₂CH₃ | H | H | —CH₃ | |
| CH₃—S— | CH₃ | —CH₂O—CH₂—CH=CH₂ | H | H | —CH₃ | |
| CH₃—S— | CH₃ | —CH₂O—CH₂—CH=CH₂ | H | —CH₃ | $-\underset{\underset{O}{\|\|}}{C}-CH_3$ | |
| CH₃S— | —CH₃ | —CH₂S—CH₃ | H | H | —CH₃ | |
| $CH_3-\underset{\underset{O}{\|}}{\overset{\overset{O}{\|}}{S}}-$ | —CH₃ | $-CH_2-\underset{\underset{O}{\|}}{\overset{\overset{O}{\|}}{S}}-CH_3$ | H | H | —CH₃ | |
| C₂H₅S— | —CH₃ | —CH₂—CH₃ | H | H | —CH₃ | |
| $C_2H_5\underset{\underset{O}{\|}}{\overset{\overset{O}{\|}}{S}}-$ | —CH₃ | $-CH_2-\underset{\underset{O}{\|}}{\overset{\overset{O}{\|}}{S}}-CH_3$ | H | H | —CH₃ | |
| C₂H₅—S— | —CH₃ | —CH₂OCH₃ | H | H | —CH₃ | |
| $C_2H_5-\underset{\underset{O}{\|}}{S}-$ | —CH₃ | —CH₂OCH₃ | H | H | —CH₃ | |
| $C_2H_5-\underset{\underset{O}{\|}}{\overset{\overset{O}{\|}}{S}}-$ | —CH₃ | —CH₂OCH₃ | H | H | —CH₃ | |
| $C_2H_5-\underset{\underset{O}{\|}}{S}-$ | —CH₃ | —CH₂SCH₃ | H | H | —CH₃ | |
| $C_2H_5-\underset{\underset{O}{\|}}{\overset{\overset{O}{\|}}{S}}-$ | —CH₃ | $-CH_2-\underset{\underset{O}{\|}}{\overset{\overset{O}{\|}}{S}}-CH_2$ | H | H | —CH₃ | |
| CH₃S— | —CH₃ | —CH₂OCH₃ | —CH₃ | H | —CH₃ | |
| $\underset{CH_3S-}{\overset{\overset{O}{\|\|}}{}}$ | —CH₃ | —CH₂OCH₃ | —CH₃ | H | —CH₃ | |
| $CH_3\underset{\underset{O}{\|}}{\overset{\overset{O}{\|}}{S}}-$ | —CH₃ | —CH₂OCH₃ | —CH₃ | H | —CH₃ | |
| $\underset{CH_3S-}{\overset{\overset{O}{\|\|}}{}}$ | —CH₃ | —CH₂Cl | —CH₃ | H | —CH₃ | |
| CH₃S— | —CH₃ | —CH₂Cl | —CH₃ | H | —CH₃ | |
| $CH_3\underset{\underset{O}{\|}}{\overset{\overset{O}{\|}}{S}}-$ | —CH₃ | —CH₂Cl | —CH₃ | H | —CH₃ | |
| CH₃S— | —CH₃ | —CH₂SCH₃ | —CH₃ | H | —CH₃ | |
| CH₃S— | —CH₃ | —CH₂SCH₃ | —CH₃ | H | —CH₃ | |
| CH₃S— | —CH₃ | —CH₂—O—CH₂—CH=CH₂ | —CH₃ | H | —CH₃ | |
| CH₃S— | H | —CH₂OCH₃ | —CH₃ | H | —CH₃ | |
| $\underset{CH_3S-}{\overset{\overset{O}{\|\|}}{}}$ | H | —CH₂OCH₃ | —CH₃ | H | CH₃ | |
| CH₃S— | H | —CH₂—SCH₃ | —CH₃ | H | CH₃ | |
| CH₃S— | H | —CH₂OCH₃ | H | H | CH₃ | |
| $\underset{CH_3S-}{\overset{\overset{O}{\|\|}}{}}$ | H | —CH₂OCH₃ | H | H | —CH₃ | |

Table—Continued

| $R_1$ | $R_2$ | $R_3$ | $R_4$ | $R_5$ | $R_6$ | Physical data |
|---|---|---|---|---|---|---|
| $CH_3\underset{\underset{O}{\|}}{\overset{\overset{O}{\|}}{S}}-$ | H | $-CH_2OCH_3$ | H | H | $-CH_3$ | |
| $CH_3S-$<br>$CH_3S$ | H<br>$-CH_3$ | $-CH_2-S-CH_3$<br>$-CH_2OCH_3$ | H<br>H | H<br>$-CH_3$ | $-CH_3$<br>$-CH_3$ | |
| $CH_3S$ | $-CH_3$ | $-CH\underset{S-CH_2}{\overset{S-CH_2}{<}}\|$ | H | H | $-CH_3$ | |

EXAMPLE 5

A) Insecticidal ingest poison action

Tobacco and potato plants are sprayed with a 0.05 percent aqueous emulsion (obtained from a 10 percent emulsifiable concentrate).

After the coating has dried, Egyptian cotton leaf worms (Spodoptera literalis) are settled on the tobacco plants and Colarado potato beetle larvae (Leptinotarsa decemlineata) on the potato plants. The test is carried out at 24°C and 60 percent relative humidity.

B) Systemic insecticidal action

To determine the systemic action, rooted bean plants (Vicia fabae) are put into a 0.01 percent aqueous active substance solution (obtained from a 10 percent emulsifiable concentrate). After 24 hours, aphids (Aphis fabae) are placed on the parts of the plant above the soil. The aphids are protected from contact and gas action by means of a special device. The test is carried out at 24°C and 70 percent relative humidity.

In the above tests the compounds according to Example I displayed good insecticidal ingest poison action and septemic insecticidal action.

EXAMPLE 6

Action against *Chilo suppressalis*

Six rice plants at a time of the variety Caloro were transplanted into plastic pots (diameter at the top = 17 cm) and reared to a height of about 60 cm. Infestation with *Chilo suppressalis* larvae ($L_1$: 3–4 mm long) took place 2 days after application of the active substance in granule form to the paddy water (rate of application: 8 kg of active substance per hectare). Evaluation of the insecticidal action took place 10 days after application of the granules.

The compounds according to Example I were active in the above test against *Chilo suppressalis*.

EXAMPLE 7

Sterilised compost earth was homogeneously mixed with a wettable powder containing 25 percent of active substance so that there resulted a rate of application of 8 kg of active substance per hectare.

Young zucchetti plants (*Cucumis pepo*) were put into plastic pots with the treated soil (3 plants per pot; diameter of pot = 7 cm). Each pot was infected immediately afterwards with 5 *Aulacophora femoralis* and *Chortophila* larvae. The control was carried out 4, 8, 16 and 32 days after depositing the larvae.

At 80–100 percent kill after the first control, a fresh infestation with 5 larvae each was carried out in the same soil sample with 3 new zucchetti plants. If the activity was less than 80 percent, the remaining larvae remained in the soil sample until the control immediately following. If an active substance at a rate of application of 8 kg/ha still effected a 100 percent kill, a further control with 4 and 2 kg of active substance per hectare was carried out.

In the above test, the compounds according to Examples 1 to 4 displayed action against *Aulacophora fermoralis* and *Chortophila* larvae.

EXAMPLE 8

Action against ticks

A) Rhicephalus bursa

5 Adult ticks or 50 tick larvae were counted into a glass tube and immersed for 1 to 2 minutes in 2 ml of an aqueous emulsion from an emulsion series each containing 100, 10, 1 and 0.1 ppm of test substance. The tube was then sealed with a standardised cotton wool plug and placed on its head, so that the cotton wool was able to absorb the active substance emulsion.

In the case of the adults evaluation took place after 2 weeks, and in that of the larvae after 2 days. Each test was repeated twice.

The compounds according to Examples 1 to 4 act in the above test against adults and larvae of *Rhicephalus bursa*.

B) *Boophilus microplus* (larvae)

Tests are carried out in each case with 20 OP-sensitive larvae using an analogous dilution series as in the case of test A. (The resistance relates to the tolerability of diazinone).

The compounds according to Example 1 act in the above test against sensitive larvae of *Boophilus microplus*.

EXAMPLE 9

Acaracidal action

*Phaseolus vulgaris* (dwarf beans) have an infested piece of leaf from a mass culture of *Tetranychus urticae* placed on them 12 hours before the test for the acaricidal action. The mobile stages which have migrated are sprayed with the emulsified test preparations from a chromatography atomiser so that the spray broth does not run off. The number of living and dead larvae, adults and eggs are evaluated after 2 to 7 days under a stereoscopic microscope and the result expressed in percentages. During the "interim," the treated plants are kept in greenhouse compartments at 25°C.

The compounds according to Examples 1 to 4 are active in the above test against eggs, larvae and adults of *Tetranychus urticae*.

EXAMPLE 10

Action against soil nematodes

To test the action against soil nematodes, the active substance (in a concentration of 50 ppm) is applied to and intimately mixed with soil infected with root gall nematodes (*Meloidgyne Avenaria*). Immediately afterwards, tomato cuttings are planted in the thus prepared soil in a series of tests and after a waiting time of 8 days tomato seeds are sown in another test series.

In order to assess the nematocidal action, the galls present on the roots are counted 28 days after planting and sowing. The compounds according to Examples 1 to 4 display a nematocidal action in the above test.

We claim:

1. A compound of the formula

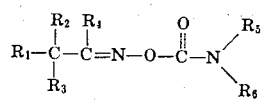

wherein $R_1$ represents methylthio or methylsulphonyl, $R_2$ represents methyl, $R_3$ represents —$CH_2$—S—$C_1$—$C_2$ alkyl, —$CH_2O$—$C_1$—$C_2$ alkyl or —$CH_2$—O—$CH=CH_2$, $R_4$ represents hydrogen, $R_5$ represents hydrogen or methyl and $R_6$ represents methyl or allyl.

2. The compound according to claim 1 of the formula

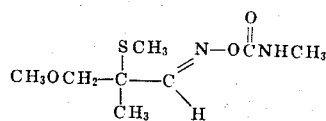

3. The compound according to claim 1 of the formula

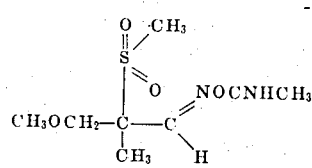

4. The compound according to claim 1 of the formula

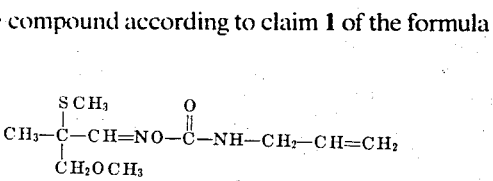

5. The compound according to claim 1 of the formula

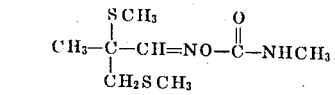

6. The compound according to claim 1 of the formula

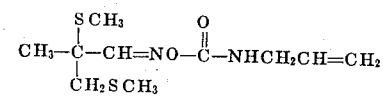

7. The compound according to claim 1 of the formula

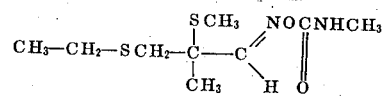

8. The compound according to claim 1 of the formula

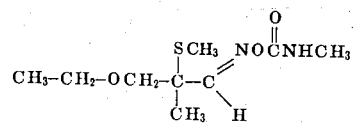

9. The compound according to claim 1 of the formula

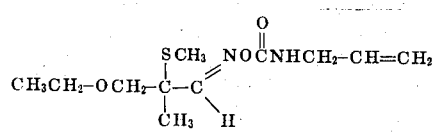

10. The compound according to claim 1 of the formula

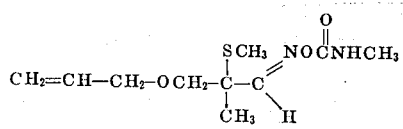

* * * * *

UNITED STATES PATENT OFFICE
CERTIFICATE OF CORRECTION

Patent No. 3,832,400  Dated August 27, 1974

Inventor(s) Willy Meyer and Beat Boehner

It is certified that error appears in the above-identified patent and that said Letters Patent are hereby corrected as shown below:

The following should be inserted in the heading:

Claims priority, application Switzerland

August 18, 1971, No. 12146/71 and

June 23, 1972, No. 9525/72

Column 25, Claim 3, in the formula, change "NOCNHCH$_3$" to
$$-- NO\overset{O}{\underset{}{C}}NHCH_3 --$$

Signed and sealed this 15th day of April 1975.

(SEAL)
Attest:

RUTH C. MASON
Attesting Officer

C. MARSHALL DANN
Commissioner of Patents
and Trademarks